United States Patent
Yamashita et al.

(10) Patent No.: US 7,756,423 B2
(45) Date of Patent: Jul. 13, 2010

(54) WAVELENGTH DIVISION MULTIPLEXING OPTICAL TRANSMISSION APPARATUS, WAVELENGTH DIVISION MULTIPLEXING OPTICAL TRANSMISSION SYSTEM AND WAVELENGTH DIVISION MULTIPLEXING OPTICAL TRANSMISSION METHOD

(75) Inventors: Makoto Yamashita, Tokyo (JP); Mizuyuki Ushirozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 846 days.

(21) Appl. No.: 11/561,309

(22) Filed: Nov. 17, 2006

(65) Prior Publication Data
US 2007/0201875 A1  Aug. 30, 2007

(30) Foreign Application Priority Data
Nov. 18, 2005  (JP) .............................. 2005-334498

(51) Int. Cl.
H04B 10/00  (2006.01)
(52) U.S. Cl. ....................... 398/199; 398/183; 398/206; 398/209
(58) Field of Classification Search .......... 398/182–201
See application file for complete search history.

(56) References Cited
U.S. PATENT DOCUMENTS

| | | | | |
|---|---|---|---|---|
| 5,430,569 A | * | 7/1995 | Blauvelt et al. | 398/199 |
| 5,778,113 A | * | 7/1998 | Yu | 385/3 |
| 5,877,881 A | * | 3/1999 | Miyauchi et al. | 398/193 |
| 6,335,813 B1 | * | 1/2002 | Janz et al. | 398/197 |
| 6,384,954 B1 | * | 5/2002 | Webb | 359/245 |
| 7,245,837 B2 | * | 7/2007 | Sakamoto et al. | 398/193 |
| 7,319,823 B2 | * | 1/2008 | Bigo et al. | 398/199 |
| 7,555,226 B2 | * | 6/2009 | Tipper | 398/198 |
| 2003/0185573 A1 | * | 10/2003 | Fells | 398/147 |
| 2004/0109698 A1 | * | 6/2004 | Kim et al. | 398/199 |
| 2005/0095012 A1 | * | 5/2005 | Watanabe | 398/199 |
| 2006/0140645 A1 | * | 6/2006 | Shastri et al. | 398/198 |

FOREIGN PATENT DOCUMENTS

JP  7-336301 A  12/1995

* cited by examiner

*Primary Examiner*—Agustin Bello
(74) *Attorney, Agent, or Firm*—Sughrue Mion, PLLC

(57) ABSTRACT

A wavelength division multiplexing optical transmission apparatus for transmitting wavelength division multiplexing optical signals, the apparatus including a plurality of optical transmitting units outputting optical signals having a different wavelength from each other, a plurality of optical intensity modulating units intensity-modulating the optical signals, and a wavelength multiplexing unit multiplexing the optical signals. The plurality of optical intensity modulating units sets the amount of wavelength chirp adapting to each wavelength of the optical signals for the optical signals outputted from each of the plurality of optical transmitting units, and the wavelength multiplexing unit multiplexes the optical signals having the amount of wavelength chirp set respectively and then outputs the multiplexed optical signals.

29 Claims, 9 Drawing Sheets

WAVELENGTH DIVISION MULTIPLEXING OPTICAL TRANSMISSION APPARATUS, WAVELENGTH DIVISION MULTIPLEXING OPTICAL TRANSMISSION SYSTEM AND WAVELENGTH DIVISION MULTIPLEXING OPTICAL TRANSMISSION METHOD

BACKGROUND OF THE INVENTION

1. Field of the Invention

The present invention relates to a wavelength division multiplexing optical transmission apparatus, a wavelength division multiplexing optical transmission system and a wavelength division multiplexing optical transmission method for transmitting wavelength division multiplexing optical signals, and more particularly to a wavelength division multiplexing optical transmission apparatus, a wavelength division multiplexing optical transmission system and a wavelength division multiplexing optical transmission method for transmitting wavelength division multiplexing optical signals with high quality.

2. Description of Related Art

In recent years, as wavelength division multiplexing means for optical signal, apparatuses using the CWDM (Coarse Wavelength Division Multiplexing) technique have been in widespread use. In the CWDM technique, the interval between multiplexed wavelengths is as wide as 20 nm, and wavelength accuracy is as moderate as central wavelength±6.5 nm. Accordingly, the CWDM technique has an advantage of not requiring accurate wavelength control and being capable of construct a network at low cost. It is important that such CWDM apparatus can be utilized irrespective of the type of transmission line and can be smoothly upgraded to large capacity in the future.

FIG. 9 illustrates wavelength assignment of CWDM, and a characteristic of dispersion and a characteristic of group delay in each of SMF (Single Mode Fiber) and DSF (Dispersion Shifted Fiber). When SMF is used as the transmission line, a zero-dispersion wavelength is in the band of 1300 nm, so all the CWDM wavelengths are positive dispersion; thus, it is not possible that the amount of group delay is identical. On the other hand, when DSF is used as the transmission line, a zero-dispersion wavelength is in the band of 1550 nm, so negative dispersion occurs in the shorter wavelength side of CWDM and positive dispersion occurs in the longer wavelength side of CWDM. Here, when dispersion, the amount of group delay and wavelength are "D", "A" and "λ", respectively, then the dispersion can be expressed as wavelength differential of the amount of group delay as indicated by the following formula (1).

$$D = dA/d\lambda \qquad (1)$$

Consequently, wavelengths having the same absolute value of dispersion in the shorter wavelength side and longer wavelength side across the zero-dispersion wavelength of the transmission line have the identical amount of group delay. When optical signals having the identical amount of group delay are multiplexed and transmitted, transmission characteristic deterioration may occurs due to nonlinear optical effects caused by XPM (cross phase modulation) or the like.

FIGS. 10A and 10B illustrate an example of prior art's wavelength division multiplexing optical transmission system.

FIG. 10A illustrates a wavelength division multiplexing optical transmission system using the CWDM technique which performs two-way transmission in one section. The wavelength division multiplexing optical transmission system 200 includes CWDM optical transceivers 101a and 101b, CWDM optical multi/demultiplexers 102a and 102b, and a transmission line 103a. As the transmission line 103a, there is used DSF.

Optical signals having respective wavelengths outputted from the CWDM optical transceivers 101a are multiplexed by the CWDM optical multi/demultiplexer 102a. The wavelength division multiplexing optical signals thus multiplexed are transmitted via the transmission line 103a and then demultiplexed by the CWDM optical multi/demultiplexer 102b and thereafter supplied to the CWDM optical transceiver 101b. Meanwhile, optical signals having respective wavelengths outputted from the CWDM optical transceivers 101b are multiplexed by the CWDM optical multi/demultiplexer 102b. The wavelength division multiplexing optical signals thus multiplexed are transmitted via the transmission line 103a and then demultiplexed by the CWDM optical multi/demultiplexer 102a and thereafter supplied to the CWDM optical transceiver 101a. In this manner, two-way transmission is implemented.

However, the above described wavelength division multiplexing optical transmission system 200 using the prior art's CWDM technique has the following problem. That is, when transmission wavelengths are arranged, as described above, across a zero-dispersion wavelength of the transmission line (indicated by dotted lines in FIG. 10A), the amount of group delay of transmitted optical signals may be identical. Accordingly, nonlinear deterioration caused by this may occur.

Thus, as a proposal of preventing this deterioration when the transmission line 103a is DSF, there is a related document 1 (Japanese Patent Application Laid-Open No. 7-336301), for example. In this document, an attempt is made to solve the above problem by assigning the wavelengths having all the wavelength division multiplexing optical signals to either of the shorter wavelength side or longer wavelength side relative to the average zero-dispersion wavelength of the whole transmission line. However, this proposal has restrictions in that only the positive dispersion region or negative dispersion region is used (four wavelengths in the example of FIG. 10A). Consequently, there is a problem of difficulties in efficiently increasing the number of multiplexed wavelengths.

As another proposal of a prior art's wavelength division multiplexing optical transmission system, there is a related document 2 (U.S. Pat. No. 6,490,064 Patent family: JP NO. 11-17656A), for example. In the related document 2, the vicinity of 1550 nm where zero dispersion occurs in the DSF is not used, and optical signals having wavelengths from 1450 nm to 1530 nm and optical signals having wavelengths from 1570 nm to 1650 nm are transmitted in a direction opposite to each other. However, in this proposal, the wavelength band in the vicinity of 1550 nm cannot be used, so there is also a problem of difficulties in efficiently increasing the number of multiplexed wavelengths.

Thus, when it is required to increase the number of multiplexed wavelengths in the prior art's wavelength division multiplexing optical transmission system, the DWDM (Dense Wavelength Division Multiplexing) technique having a dense wavelength grid must be used.

FIG. 10B illustrates a wavelength division multiplexing optical transmission system using the DWDM technique which performs two-way transmission in one section. The wavelength division multiplexing optical transmission system 300 includes DWDM optical transceivers 101c and 101d, DWDM optical multi/demultiplexers 102c and 103d, and a transmission line 103b. As the transmission line 103b, there is used DSF.

Optical signals having respective wavelengths outputted from the DWDM optical transceivers 101c are multiplexed by the DWDM optical multi/demultiplexer 102c. The wavelength division multiplexing optical signals thus multiplexed are transmitted via the transmission line 103b and then demultiplexed by the DWDM optical multi/demultiplexer 102d and thereafter supplied to the DWDM optical transceiver 101d. Meanwhile, optical signals having respective wavelengths outputted from the DWDM optical transceivers 101d are multiplexed by the DWDM optical multi/demultiplexer 102d. The wavelength division multiplexing optical signals thus multiplexed are transmitted via the transmission line 103b and then demultiplexed by the DWDM optical multi/demultiplexer 102c and thereafter supplied to the DWDM optical transceiver 101c. In this manner, two-way transmission is implemented.

However, the above described wavelength division multiplexing optical transmission system 300 using the prior art's DWDM technique has the following problem. That is, as shown in FIG. 10B, it is required to arrange the range of multiplexed DWDM wavelengths so as not to include the zero-dispersion wavelength of transmission line, so that the amount of group delay of transmitted optical signals is not identical. Further, there is a disadvantage in that the optical multi/demultiplexer is dedicated to DWDM, so the compatibility with CWDM apparatus is not achieved and besides, a cost increases.

Further, in the wavelength division multiplexing optical transmission system, generally, dispersion tolerance is narrowed with the increase of transmission bit rate. Particularly, it is difficult to ensure dispersion tolerance at a high bit rate of 10 Gb/s or the like. It is noted here that "dispersion tolerance" means a dispersion value tolerance to guarantee the transmission quality. Thus, in the related documents 1 and 2, dispersion compensation is performed using a dispersion compensating fiber. In these documents, with the above assignment, it is attempted to ensure dispersion tolerance. However, the dispersion compensating fiber is generally costly. Also, the dispersion compensating fiber has large transmission loss; when optical signals pass through it, unwanted transmission loss occurs. Therefore, there is a problem in that the cost further increases due to additionally installed optical amplifiers.

SUMMARY OF THE INVENTION

In view of the foregoing and other exemplary problems, drawbacks, and disadvantages of the related art methods and structures, exemplary feature of the present invention is to provide a wavelength division multiplexing optical transmission apparatus, a wavelength division multiplexing optical transmission system and a wavelength division multiplexing optical transmission method capable of performing wavelength division multiplexing transmission without deteriorating optical signals under communication environment where dispersion tolerance is narrowed.

A wavelength division multiplexing optical transmission apparatus according to the present invention for transmitting wavelength division multiplexing optical signals, the apparatus including a plurality of optical transmitting units outputting optical signals having a different wavelength from each other, a plurality of optical intensity modulating units intensity-modulating the optical signals, and a wavelength multiplexing unit multiplexing the optical signals. The plurality of optical intensity modulating units sets the amount of wavelength chirp adapting to each wavelength of the optical signals for the optical signals outputted from each of the plurality of optical transmitting units, and the wavelength multiplexing unit multiplexes the optical signals having the amount of wavelength chirp set respectively and then outputs the multiplexed optical signals.

A wavelength division multiplexing optical transmission system transmitting wavelength division multiplexing optical signals, the system including the wavelength division multiplexing optical transmission apparatus mentioned above, and a transmission line transmitting the plurality of multiplexed optical signals.

A wavelength division multiplexing optical transmission method of transmitting wavelength division multiplexing optical signals, the method including (a) outputting optical signals having a different wavelength from each other, (b) intensity-modulating the optical signals and thereby setting the amount of wavelength chirp adapting to each wavelength of the optical signals for each of the optical signals, (c) multiplexing the optical signals having the amount of wavelength chirp set respectively, and (d) outputting the multiplexed optical signals.

The wavelength division multiplexing optical transmission apparatus, the wavelength division multiplexing optical transmission system and the wavelength division multiplexing optical transmission method according to the present invention have an advantageous effect of being capable of performing wavelength division multiplexing transmission without deteriorating optical signals under communication environment where dispersion tolerance is narrowed.

BRIEF DESCRIPTION OF THE DRAWINGS

The exemplary aspects, features and advantages of the present invention will become more apparent from the following detailed description when taken in conjunction with the accompanying drawings wherein.

DETAILED DESCRIPTION OF THE EXEMPLARY ASPECTS

Figure 1:
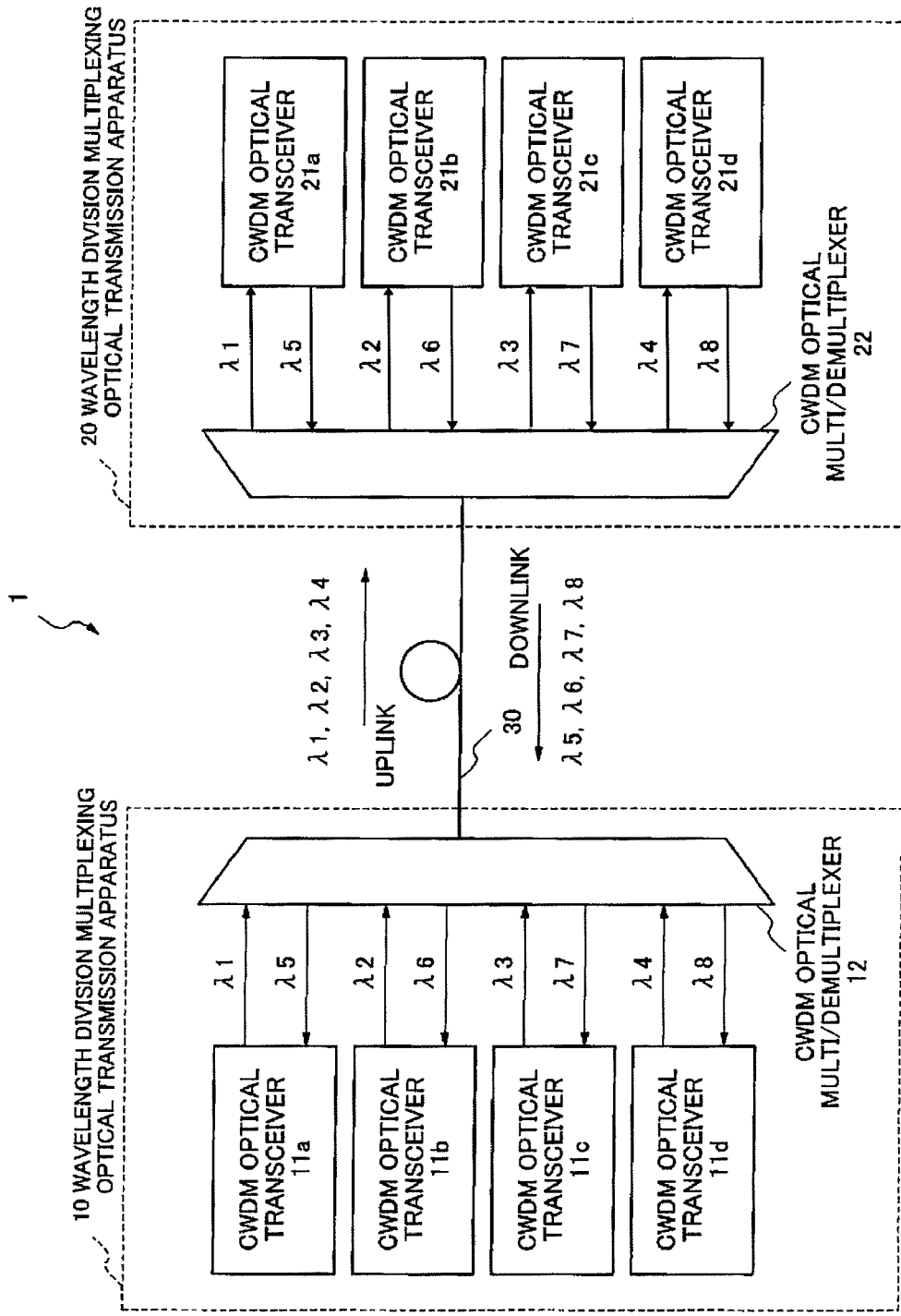
FIG. 1 is a block diagram illustrating an exemplary configuration of a wavelength division multiplexing optical transmission system according to a first embodiment of the present invention.

Exemplary aspects for carrying out the present invention will be described in detail below with reference to the drawing. The exemplary aspects described below show only illustrative examples in understanding the present invention, and the claims of the invention are not limited to these exemplary aspects.

A wavelength division multiplexing optical transmission apparatus, a wavelength division multiplexing optical transmission system and a wavelength division multiplexing optical transmission method according to the present invention have a feature of preventing optical signals having the identical amount of group delay from being transmitted in the same direction and thereby suppressing transmission characteristic deterioration caused by cross phase modulation (XPM) or the like. At the same time, the wavelength division multiplexing optical transmission apparatus, the wavelength division multiplexing optical transmission system and the wavelength division multiplexing optical transmission method according to the present invention also has a feature of being capable of ensuring required dispersion tolerance by applying a wavelength chirp having a value that fitted respective wavelength division multiplexing optical signals.

A wavelength division multiplexing optical transmission apparatus, a wavelength division multiplexing optical transmission system and a wavelength division multiplexing optical transmission method according to a first embodiment of the present invention will be described below in detail. FIG. 1 is a block diagram illustrating an exemplary configuration of a wavelength division multiplexing optical transmission system according to the first embodiment of the present invention. Descriptions will be given below with reference to FIG. 1.

The wavelength division multiplexing optical transmission system 1 illustrated in FIG. 1 is one using the CWDM (Coarse Wavelength Division Multiplexing) technique which performs two-way optical transmission in one section. The wavelength division multiplexing optical transmission system 1 includes a wavelength division multiplexing optical transmission apparatus 10, a wavelength division multiplexing optical transmission apparatus 20 and a transmission line 30 of optical fiber. The wavelength division multiplexing optical transmission apparatuses 10 and 20 are connected to each other via the transmission line 30. Assume that both dispersion shifted fiber (DSF) having the zero-dispersion wavelength in the band of 1500 nm and single mode fiber (SMF) having the zero-dispersion wavelength in the band of 1300 nm are permitted to be used for the transmission line 30.

The wavelength division multiplexing optical transmission apparatus 10 includes CWDM optical transceivers 11a to 11d and a CWDM optical multi/demultiplexer 12. The CWDM optical transceivers 11a to 11d transmit/receive an optical signal of a predetermined wavelength. The CWDM optical multi/demultiplexer 12 multiplexes optical signals of plural wavelengths transmitted from the CWDM optical transceivers 11a to 11d. At the same time, the CWDM optical multi/demultiplexer 12 demultiplexes optical signals, which are transmitted to the CWDM optical transceivers 11a to 11d, to an optical signal of each wavelength. Similarly, the wavelength division multiplexing optical transmission apparatus 20 includes CWDM optical transceivers 21a to 21d and a CWDM optical multi/demultiplexer 22.

Figure 2:
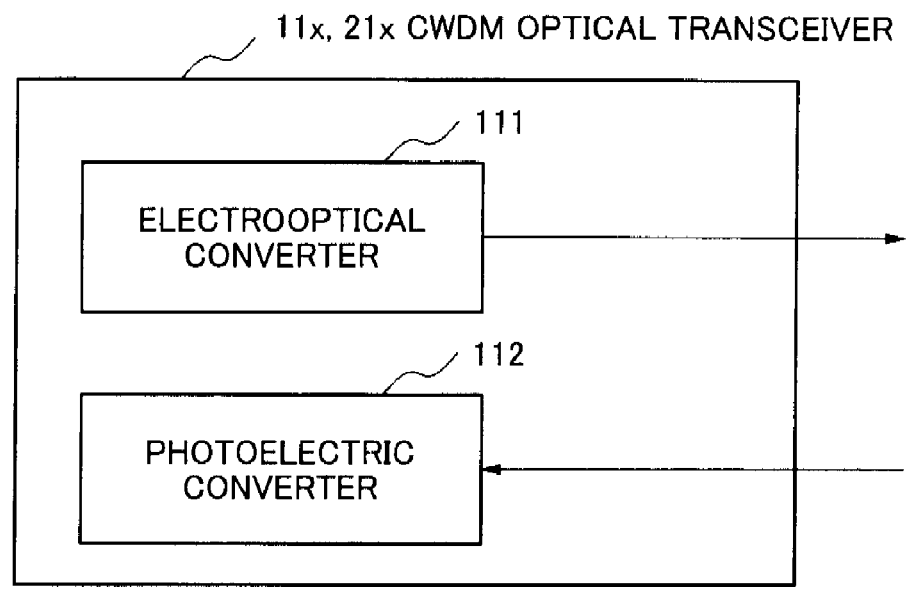
FIG. 2 is a block diagram illustrating an exemplary configuration of CWDM optical transceivers 11x and 21x in FIG. 1.

The CWDM optical transceivers 11x and 21x (x: a to d) includes, as illustrated in FIG. 2, an electrooptical converter 111 and a photoelectric converter 112. The electrooptical converter 111 converts an electrical signal into a digital optical signal of a predetermined wavelength and transmits the digital signal. The photoelectric converter 112 converts a received digital optical signal into an electrical signal.

Figure 3:
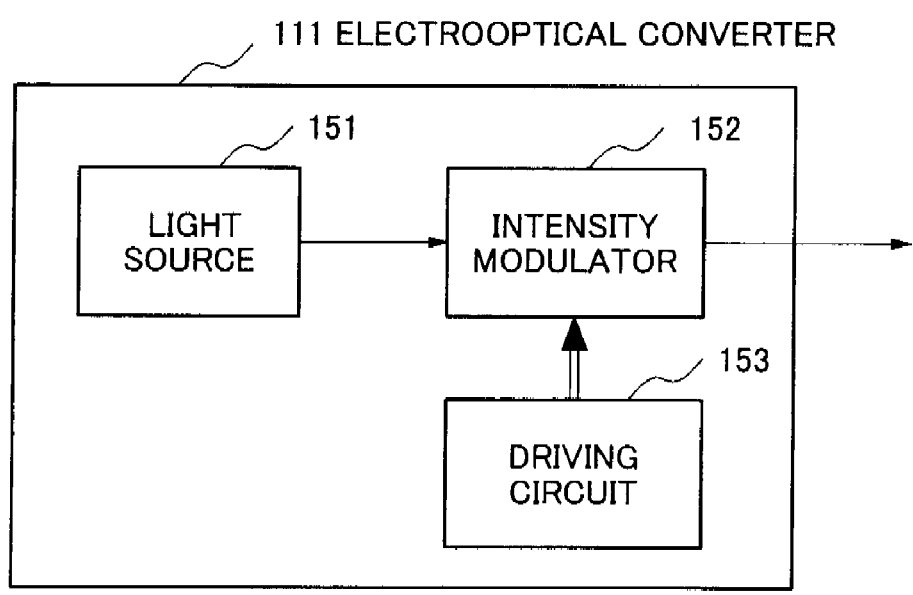
FIG. 3 is a block diagram illustrating an exemplary configuration of an electrooptical converter 111 in FIG. 2.

Further, the electrooptical converter 111 includes, as illustrated in FIG. 3, a light source 151, an intensity modulator 152 and a driving circuit 153. The light source 151 transmits laser light of a predetermined wavelength. The intensity modulator 152 modulates the intensity of laser light transmitted from the light source 151 to output the digital optical signal produced thereby. The driving circuit 153 controls the modulation operation etc. performed by the intensity modulator 152. In FIG. 3, the arrow from the driving circuit 153 to the intensity modulator 152 indicates electrical control.

In this manner, according to the configuration of the CWDM optical transceivers 11x and 21x, the light source 151 and the photoelectric converter 112 function as optical transmitting/receiving means for transmitting/receiving light. Also, the intensity modulator 152 and the driving circuit 153 function as wavelength chirp setting means for setting laser light from the light source 151 to the amount of wavelength chirp adapting to the wavelength of the light.

The operation of the wavelength division multiplexing optical transmission system 1 according to the first embodiment of the present invention will be described below. In the wavelength division multiplexing optical transmission system 1 according to the first embodiment, wavelengths are selected so that the amounts of group delay are different for each optical signal sent in the same direction by wavelength division multiplexing transmission.

Figure 4:
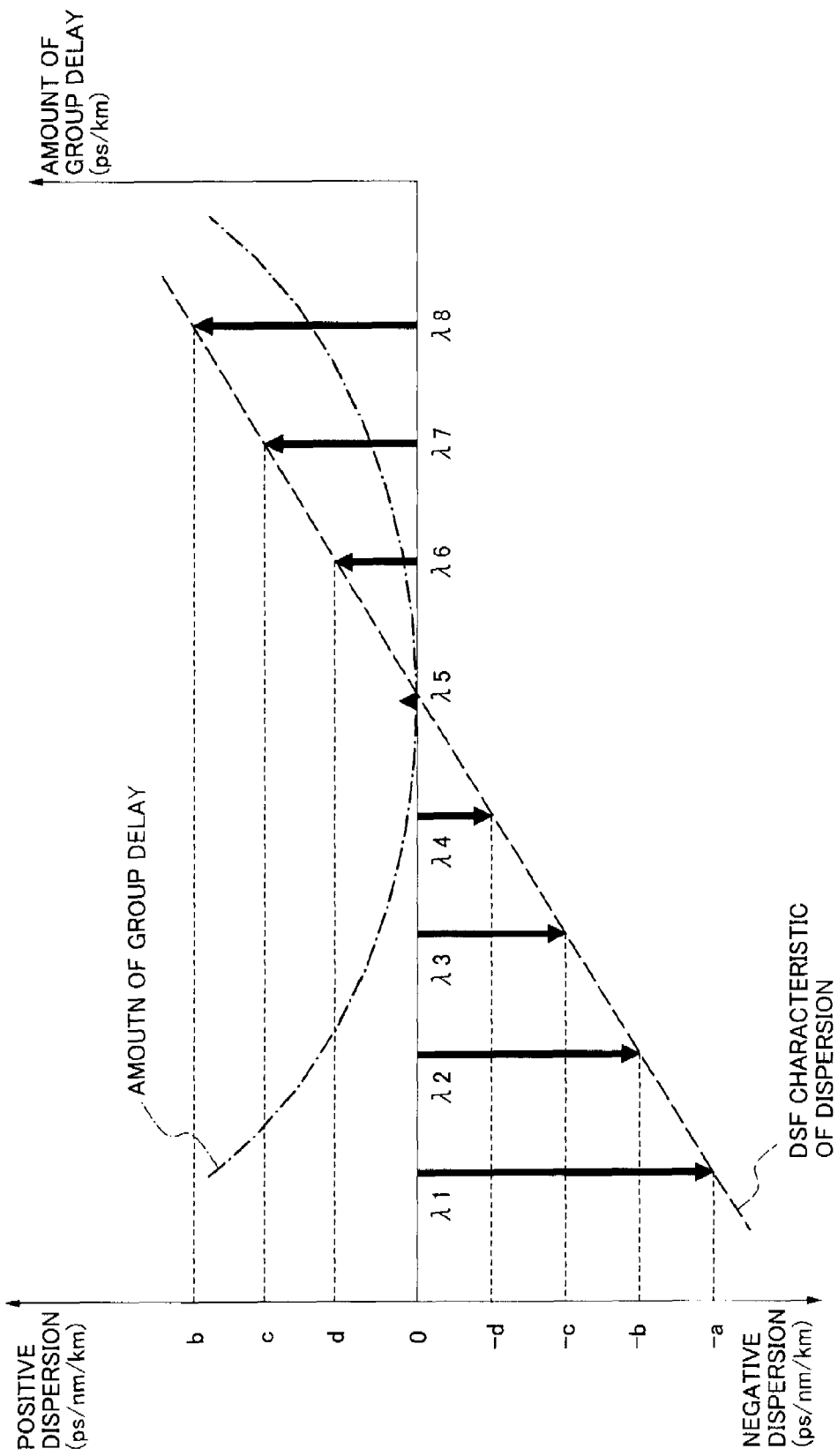
FIG. 4 is a view illustrating an example of wavelength assignment and characteristic of dispersion at each wavelength when DSF is used as the transmission line.

For example, it is assumed that the assignment of multiplexed wavelengths and the characteristic of dispersion of the transmission line 30 are as illustrated in FIG. 4. In this case, optical signals of $\lambda 1$ to $\lambda 4$ (wavelengths in the negative dispersion range) are made to be multiplexed and transmitted in one direction (for example, uplink direction). Similarly, optical signals of $\lambda 5$ to $\lambda 8$ (wavelengths in the zero dispersion and positive dispersion range) are made to be multiplexed and transmitted in the opposite direction (for example, downlink direction).

Optical signals of respective wavelengths $\lambda 1$ to $\lambda 4$ outputted from the CWDM optical transceivers 11a to 11d of the wavelength division multiplexing optical transmission apparatus 10 are multiplexed by the CWDM optical multi/demultiplexer 12. The wavelength division multiplexing optical signals thus multiplexed are transmitted via the transmission line 30 in the uplink direction and then demultiplexed by the CWDM optical multi/demultiplexer 22. Thereafter, the demultiplexed optical signals of respective wavelengths $\lambda 1$ to $\lambda 4$ are supplied to the CWDM optical transceivers 21a to 21d.

Meanwhile, optical signals of respective wavelengths $\lambda 5$ to $\lambda 8$ outputted from the CWDM optical transceivers 21a to 21d of the wavelength division multiplexing optical transmission apparatus 20 are multiplexed by the CWDM optical multi/demultiplexer 22. The wavelength division multiplexing optical signals thus multiplexed are transmitted via the transmission line 30 in the downlink direction and then demultiplexed by the CWDM optical multi/demultiplexer 12. Thereafter, the demultiplexed optical signals of respective wavelengths $\lambda 5$ to $\lambda 8$ are supplied to the CWDM optical transceivers 11a to 11d.

When DSF is used as the transmission line 30 and at the same time, the wavelength assignment and the characteristic of dispersion of the DSF are as illustrated in FIG. 4, the DSF has negative dispersion at wavelengths λ1 to λ4, zero dispersion at wavelength λ5 and positive dispersion at wavelengths λ6 to λ8. Assume that dispersion values at respective wavelengths are as follows, for example.

Dispersion value at λ1: −a ps/nm/km
Dispersion value at λ2: −b ps/nm/km
Dispersion value at λ3: −c ps/nm/km
Dispersion value at λ4: −d ps/nm/km
Dispersion value at λ5: 0 ps/nm/km
Dispersion value at λ6: d ps/nm/km
Dispersion value at λ7: c ps/nm/km
Dispersion value at λ8: b ps/nm/km Here, when the absolute value of dispersion is identical between a wavelength in the positive dispersion region and a wavelength in the negative dispersion region (i.e. in the above described example of dispersion values, wavelengths λ2 and λ8, wavelengths λ3 and λ7, wavelengths λ4 and λ6), the amount of group delay is identical. Accordingly, as with the prior art's wavelength division multiplexing optical transmission system, when the optical signals are multiplexed and then transmitted in the same direction, transmission characteristic deterioration is caused by nonlinear optical effects such as XPM.

Thus, in the wavelength division multiplexing optical transmission system 1 according to the first embodiment, as illustrated in FIG. 1, the optical signals of the wavelengths λ1 to λ4 are multiplexed and then transmitted in one direction; the optical signals of the wavelengths λ5 to λ8 are multiplexed and then transmitted in the opposite direction. Accordingly, the amounts of group delay are different for each wavelength belonging to the wavelength group transmitted in the same direction. Consequently, transmission characteristic deterioration caused by nonlinear optical effects can be suppressed.

Figure 5:
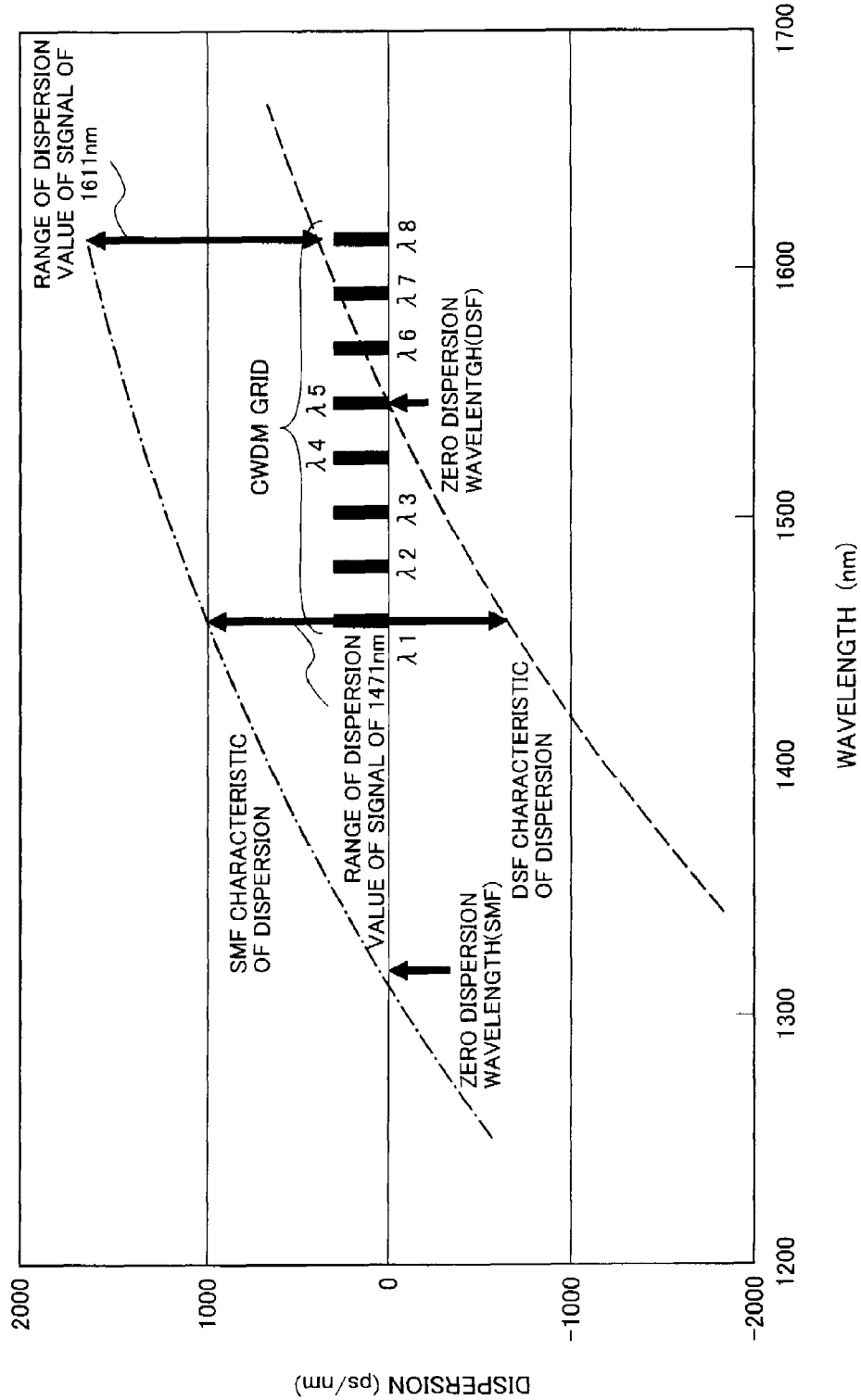
FIG. 5 is a view illustrating characteristics of dispersion of SMF and DSF with respect to CWDM grid wavelength.

FIG. 5 is a view illustrating characteristics of dispersion of SMF and DSF with respect to CWDM grid wavelength. This drawing illustrates a characteristic of dispersion with respect to each wavelength when it is assumed that SMF or DSF is used as the transmission line 30. In a system where both of SMF and DSF are permitted to be used as the transmission line, the range of dispersion value of each wavelength is naturally wider than that of a system where only one of SMF and DSF is permitted to be used. For example, in the example of FIG. 5, the ranges are as follow.

Range of dispersion value at λ1: −600 ps/nm to +1000 ps/nm

Range of dispersion value at λ8: +300 ps/nm to +1600 ps/nm

Thus, when the transmission line has the above range of dispersion value, the dispersion tolerance of the CWDM optical transceiver required for covering dispersion values at all the wavelengths is −600 ps/nm to +1600 ps/nm.

Figure 6:
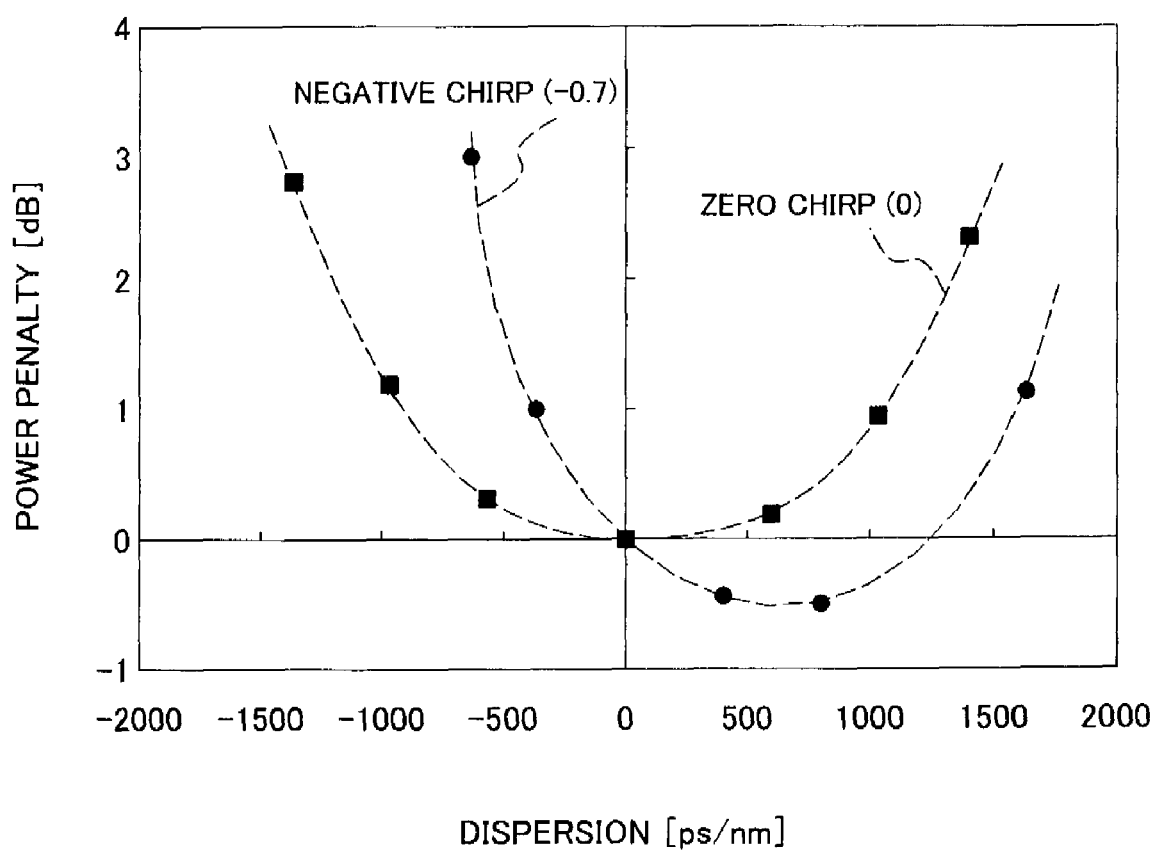
FIG. 6 is a view illustrating dispersion tolerance when wavelength chirp applied to optical signals transmitted to the transmission line is varied.

FIG. 6 is a view illustrating dispersion tolerance when wavelength chirp applied to optical signals transmitted to the transmission line is varied. Here, there is illustrated the dispersion tolerance when transmission is performed at the bit rate of 10 Gb/s and optical signals are modulated by zero chirp and negative chirp.

The optical signal by zero chirp (parameter $\alpha=0$) can be implemented, for example when an LiNbO$_3$ (Lithium Niobate) Mach-Zehnder modulator (hereinafter, "LN modulator") of zero-chirp type having symmetrical structure is used as the intensity modulator 152 illustrated in FIG. 3. More specifically, the optical signal by zero chirp can be implemented by causing an X-Cut LN modulator to perform modulation. Meanwhile, the optical signal by negative chirp (in the example of FIG. 6, parameter $\alpha=-0.7$) can be implemented, for example when an LN modulator of pre-chirp type having asymmetrical structure is used as the intensity modulator 152 illustrated in FIG. 3. More specifically, the optical signal by negative chirp ($\alpha=-0.7$) can be implemented by causing a Z-Cut LN modulator to perform modulation.

When only one of the wavelength chirps is used, it is difficult to cover the range of dispersion values at all the CWDM wavelengths in FIG. 5. More specifically, in the system where both SMF and DSF are permitted to be used, it is difficult to cover the range of dispersion values at all the CWDM wavelengths by using only one of the wavelength chirps.

However, in FIG. 1, the CWDM optical transceivers 11a and 11b are set to transmit optical signals of zero chirp ($\alpha=0$), and the CWDM optical transceivers 11c, 11d, and 21a to 21d are set to transmit optical signals of negative chirp (in the example of FIG. 6, $\alpha=-0.7$). As a result, power penalty can be reduced to 1 dB or less for all the CWDM wavelengths (1471 to 1611 nm), thus allowing satisfactory 10 Gb/s transmission. In this example, the value of power penalty allowing satisfactory transmission is assumed to be 1 dB or less. However, the value can be set to any desired one.

To explain more specifically, the optical signal (λ1: wavelength 1471 nm) of the CWDM optical transceiver 11a is set to zero chirp ($\alpha=0$). As evident from FIG. 5, the dispersion value range of the optical signal of wavelength 1471 nm is −600 to +1000 ps/nm. Thus, as evident from FIG. 6, when the dispersion value is −600 ps/nm at zero chirp ($\alpha=0$), the power penalty is 1 dB or less. When the dispersion value is +1000 ps/nm at zero chirp ($\alpha=0$), the power penalty is similarly 1 dB or less. Subsequently, the optical signal (λ8: wavelength 1611 nm) of the CWDM optical transceiver 11a is set to negative chirp ($\alpha=-0.7$). As evident from FIG. 5, the dispersion value range of the optical signal of wavelength 1611 nm is +300 to +1600 ps/nm. Thus, as evident from FIG. 6, when the dispersion value is +300 ps/nm at negative chirp ($\alpha=-0.7$), the power penalty is 1 dB or less. When the dispersion value is +1600 ps/nm at negative chirp ($\alpha=-0.7$), the power penalty is similarly 1 dB or less. For another wavelength, also, when zero chirp ($\alpha=0$) and negative chirp ($\alpha=-0.7$) are similarly appropriately used, power penalty can be reduced to 1 dB or less at all the wavelengths.

In this manner, the amount of wavelength chirp (chirping parameter) is selected for the optical signal of each transmitted wavelength so that power penalty is a predetermined value or less at all the CWDM wavelengths. Accordingly, wavelength division multiplexing optical transmission at a high bit rate such as 10 Gb/s can be satisfactorily implemented with respect to all the CWDM wavelengths (1471 to 1611 nm)

For example, in the above described exemplary configuration according to the first embodiment, the CWDM optical transceivers 11a and 11b transmitting optical signals of wavelengths λ1 and λ2 are made to include an X-Cut LN modulator as the intensity modulator 152; the CWDM optical transceivers 11c, 11d, 21a to 21d transmitting optical signals of wavelengths λ3 to λ6 are made to include a Z-Cut LN modulator as the intensity modulator 152.

The advantageous effects of the wavelength division multiplexing optical transmission system according to the first embodiment of the present invention will be described below.

As described above, in the wavelength division multiplexing optical transmission system according to the first embodiment of the present invention, when performing wavelength division multiplexing, wavelengths are selected so that optical signals of wavelengths having the identical amount of group delay are not transmitted in the same direction. Also, wavelengths are selected so that optical signals of wavelengths having the identical amount of group delay are transmitted in the opposite direction to each other. Consequently, the wavelength division multiplexing optical transmission system according to the first embodiment can suppress transmission characteristic deterioration caused by cross phase modulation (XPM) or the like.

Further, in the wavelength division multiplexing optical transmission system according to the first embodiment, a plurality of different wavelength chirps (for example, chirps of 0 and −0.7) are used for the optical signal transmitted from each CWDM optical transceiver, whereby the amount of wavelength chirp adapting to the optical signal of each wavelength multiplexed is set. In other words, there is provided an intensity modulator compatible with the amount of wavelength chirp. Accordingly, as for a system where both SMF and DSF are permitted to be used as the transmission line, power penalty on the transmission line can be reduced to a predetermined value or less with respect to all the wavelengths (1471 to 1611 nm) used for CWDM wavelength division multiplexing transmission. Consequently, a desired dispersion tolerance can be ensured; thus, in a wavelength division multiplexing optical transmission system based on the CWDM technique, even when communication is performed under an environment, such as high-bit rate environment, where the range of dispersion tolerance is narrowed, high-speed transmission is possible without deteriorating optical signals.

Moreover, in the wavelength division multiplexing optical transmission system according to the first embodiment, as described above, there can be ensured the dispersion tolerance covering the range of dispersion at all the wavelengths used on the transmission line. Accordingly, even when SMF and DSF are used together on the transmission line, or even when it is not evident whether the type of optical fiber used as the transmission line is SMF or DSF, it is not necessary to be identified what kind of optical fiber it is. When the wavelength division multiplexing optical transmission system according to the present embodiment is used, high-speed wavelength division multiplexing optical transmission can be performed with high quality.

Each of the above described advantageous effects according to the first embodiment is particularly effective, because effects of cross phase modulation (XPM) become noticeable in the case where transmission rate is 10 Gb/s or more.

An optical transmission system according to a second embodiment of the present invention will be described below. In the above described first embodiment, there is illustrated a case where DSF is used as the transmission line 30 and at the same time, the number of wavelengths in the negative dispersion region is identical with the number of wavelengths in the positive dispersion region (including zero dispersion wavelength). Thus, grouping into wavelengths in the negative dispersion region and wavelengths in the positive dispersion region is made, whereby wavelength division multiplexing transmission is performed so that the two groups are transmitted in the opposite direction to each other.

Figure 7:
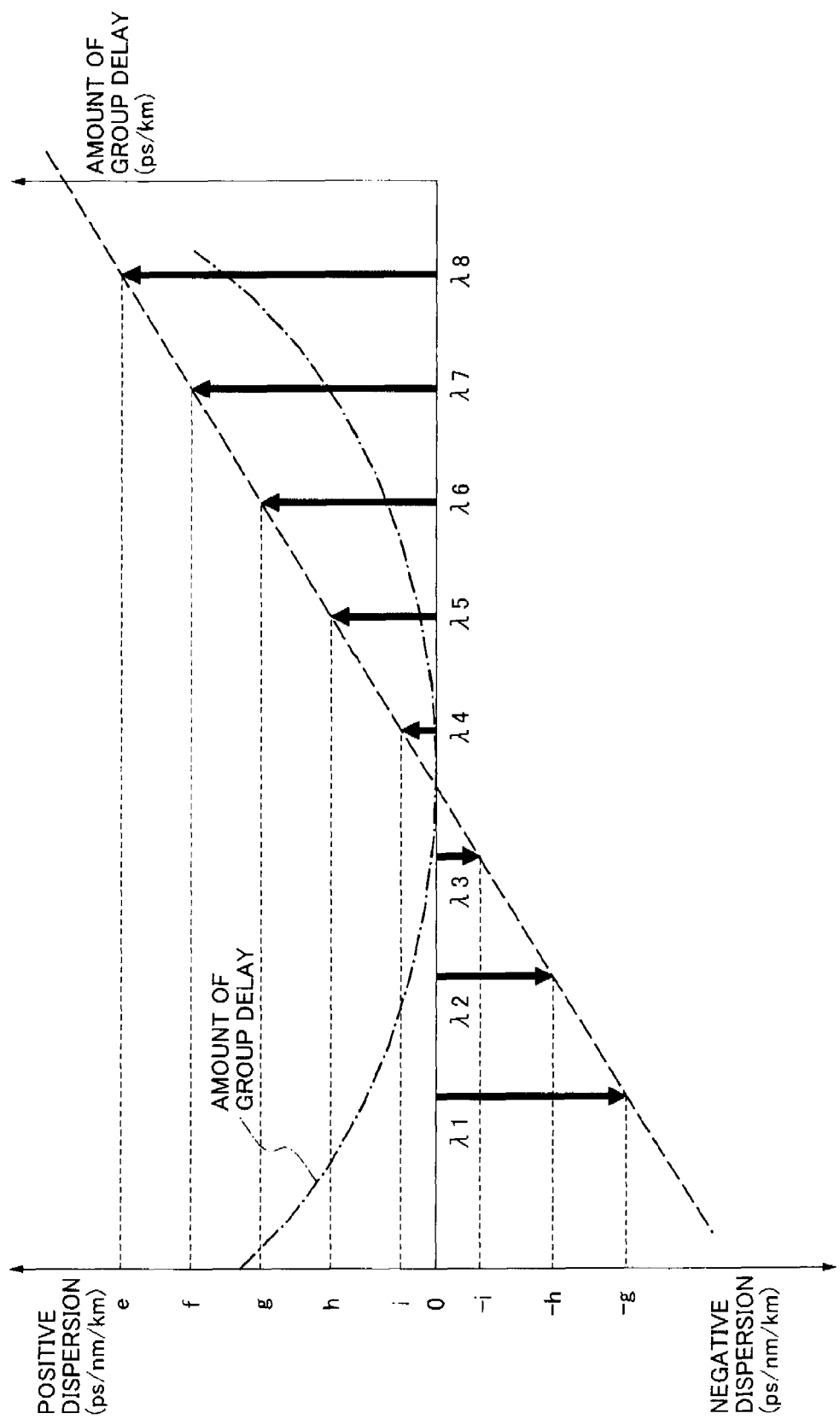
FIG. 7 is a view illustrating a characteristic of dispersion with respect to each wavelength in a type of fiber, having a characteristic of dispersion different from that of DSF, according to a second embodiment of the present invention.
Figure 8:
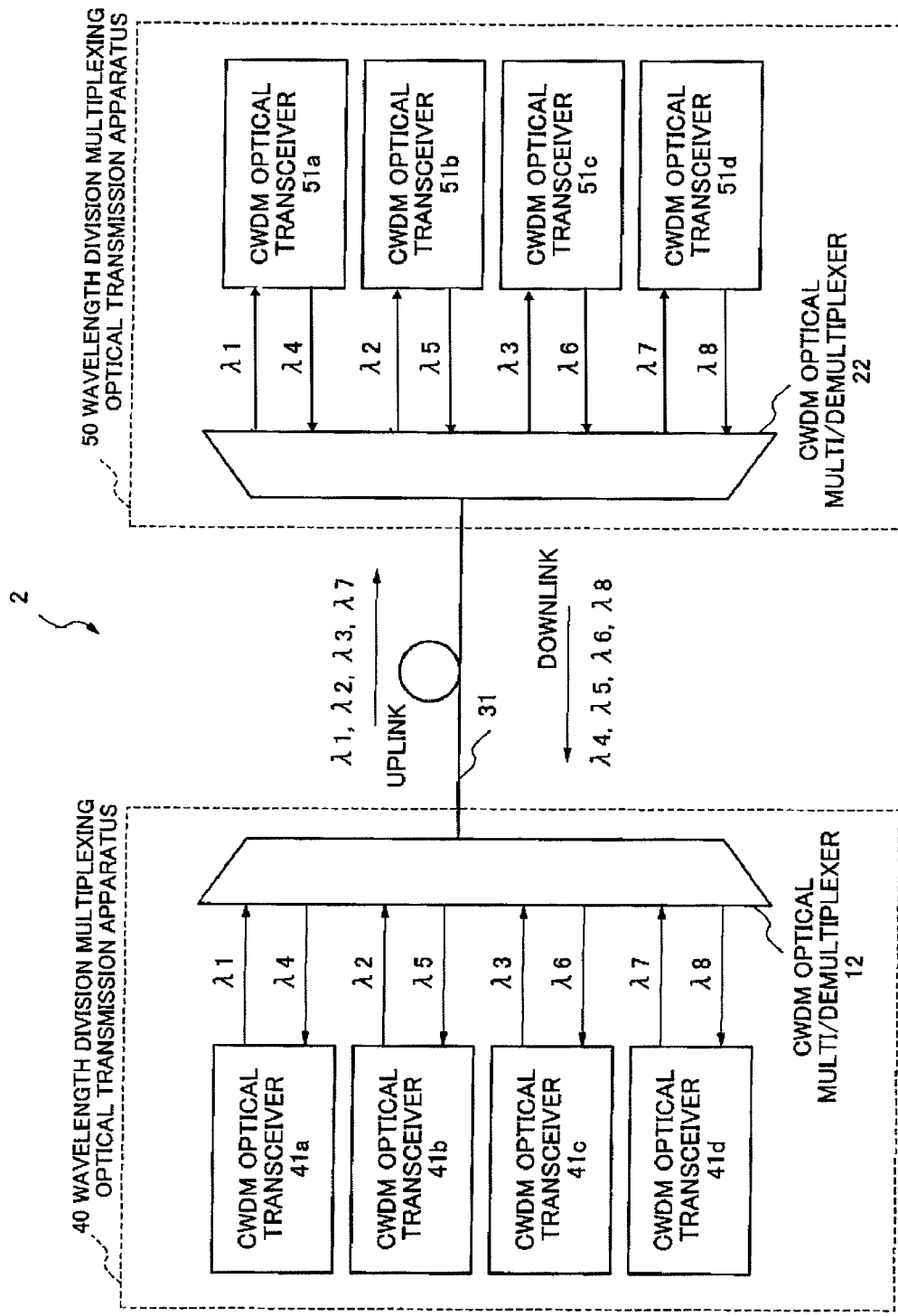
FIG. 8 is a block diagram illustrating an exemplary configuration of a wavelength division multiplexing optical transmission system according to the second embodiment of the present invention.
Figure 9:
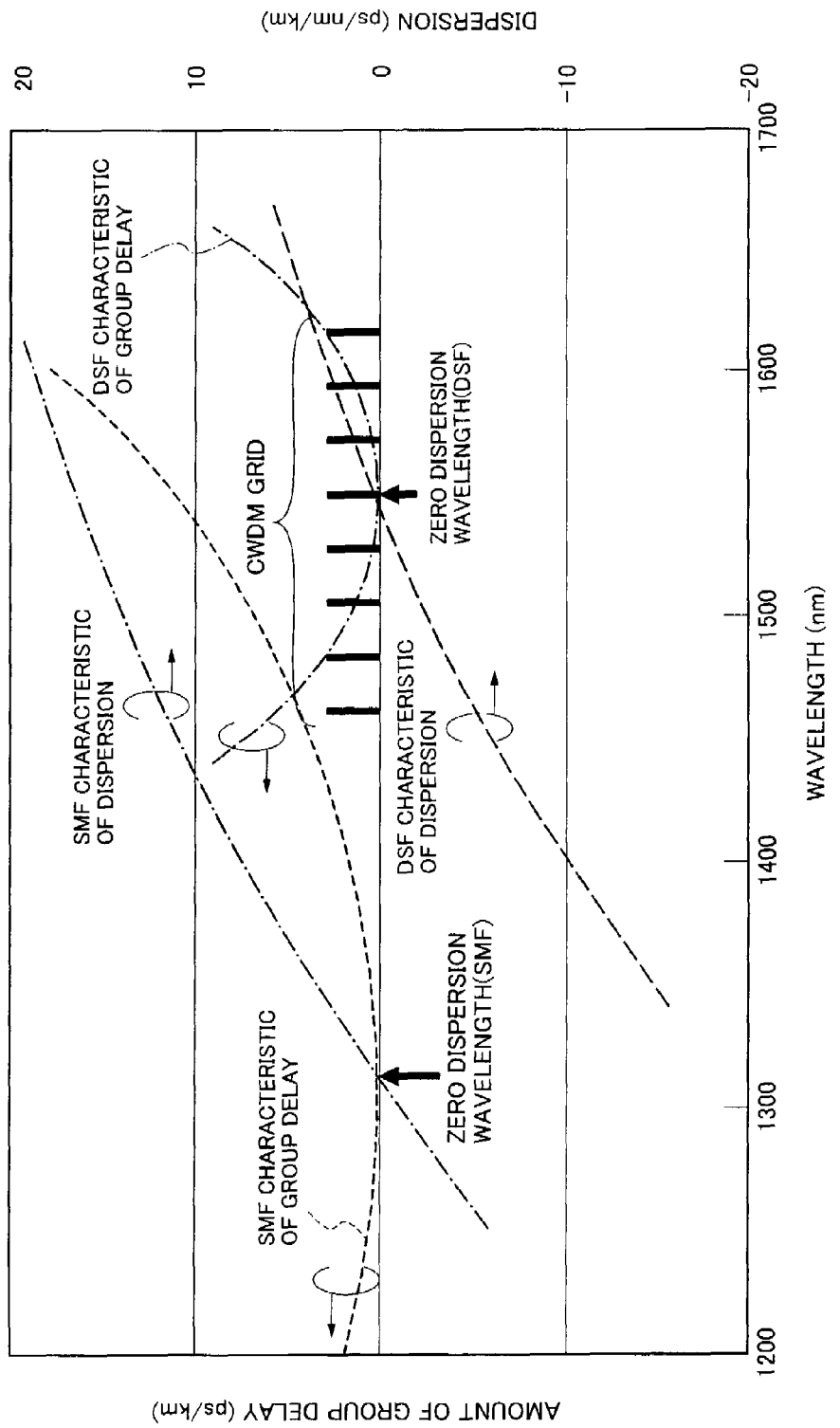
FIG. 9 is view illustrating CWDM grid wavelength, and a characteristic of dispersion and a characteristic of group delay of each of SMF and DSF.
Figure 10A:
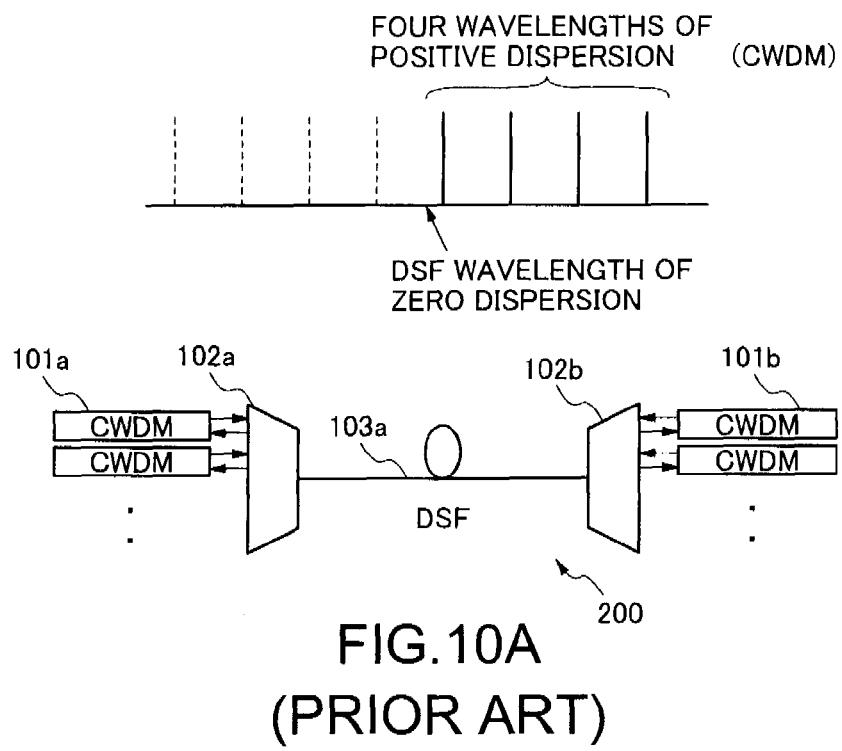
FIG. 10A is a view illustrating a wavelength division multiplexing optical transmission system using the prior art's CWDM technique.
Figure 10B:
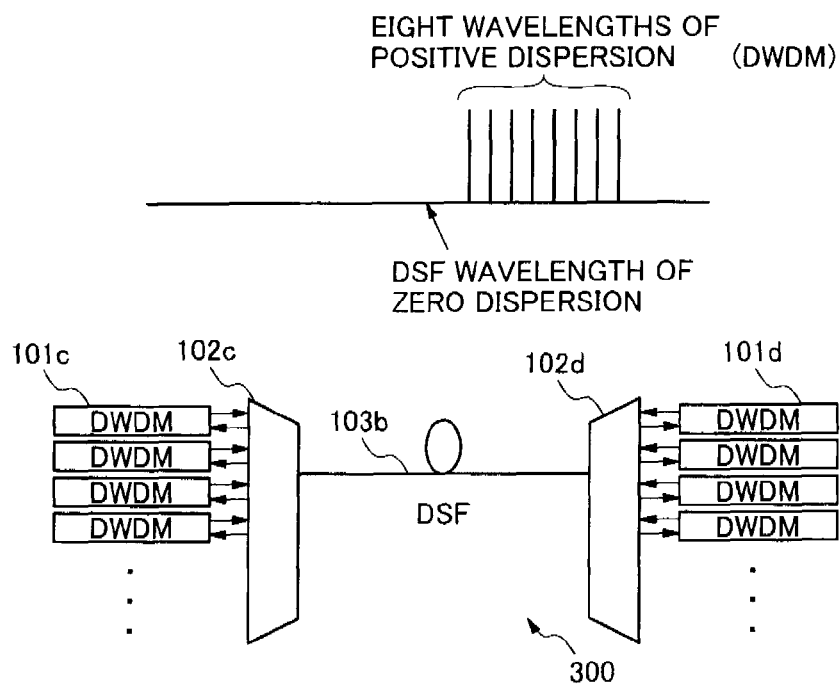
FIG. 10B is a view illustrating a wavelength division multiplexing optical transmission system using the prior art's DWDM technique.

FIG. 7 is a view illustrating a characteristic of dispersion with respect to each wavelength in a type of fiber, having a characteristic of dispersion different from that of DSF, according to the second embodiment of the present invention. FIG. 8 is a block diagram illustrating an exemplary configuration of a wavelength division multiplexing optical transmission system according to the second embodiment of the present invention.

The second embodiment is a case where the transmission line 31 in FIG. 8 has the characteristic of dispersion illustrated in FIG. 7, i.e., the zero dispersion wavelength being positioned between $\lambda 3$ and $\lambda 4$, the number of wavelengths in the negative dispersion region being different from the number of wavelengths in the positive dispersion region. An explanation of parts corresponding to the above described first embodiment is omitted here.

The wavelength division multiplexing optical transmission system 2 according to the second embodiment includes, as illustrated in FIG. 8, a wavelength division multiplexing optical transmission apparatus 40, a wavelength division multiplexing optical transmission apparatus 50 and a transmission line 31 of optical fiber. The wavelength division multiplexing optical transmission apparatuses 40 and 50 are connected via the transmission line 31. As the transmission line 31, there is used an optical fiber having a different characteristic of dispersion from that of DSF. Representatives are NZ-DSF (Non-Zero Dispersion Shifted Fiber) and the like.

The wavelength division multiplexing optical transmission apparatus 40 includes CWDM optical transceivers 41a to 41d, and a CWDM optical multi/demultiplexer 12. Similarly, the wavelength division multiplexing optical transmission apparatus 50 includes CWDM optical transceivers 51a to 51d, and a CWDM optical multi/demultiplexer 22. The configurations of the CWDM optical transceivers 41a to 41d, and 51a to 51d are similar to that of the CWDM optical transceivers 11x and 21x according to the first embodiment illustrated in FIG. 2. The configuration of an electrooptical converter installed, similarly to the first embodiment, in the CWDM optical transceivers 41a to 41d, and 51a to 51d is also similar to that of the electrooptical converter 111 illustrated in FIG. 3.

According to the second embodiment, as illustrated in FIG. 7, dispersion values at respective wavelengths are as follows.
Dispersion value at $\lambda 1$: −g ps/nm/km
Dispersion value at $\lambda 2$: −h ps/nm/km
Dispersion value at $\lambda 3$: −i ps/nm/km
Dispersion value at $\lambda 4$: i ps/nm/km
Dispersion value at $\lambda 5$: h ps/nm/km
Dispersion value at $\lambda 6$: g ps/nm/km
Dispersion value at $\lambda 7$: f ps/nm/km
Dispersion value at $\lambda 8$: e ps/nm/km The amount of group delay is identical between wavelength $\lambda 1$ in the negative dispersion region and wavelength $\lambda 6$ in the positive dispersion region, $\lambda 1$ and $\lambda 6$ having the identical absolute value of dispersion. The same is applied to wavelengths $\lambda 2$ and $\lambda 5$, and to wavelengths $\lambda 3$ and $\lambda 4$. Thus, in the wavelength division multiplexing optical transmission system 2 according to the second embodiment, as illustrated in FIG. 8, optical signals of $\lambda 1$, $\lambda 2$, $\lambda 3$ and $\lambda 7$ are multiplexed and then transmitted in one direction; optical signals of $\lambda 4$, $\lambda 5$, $\lambda 6$ and $\lambda 8$ are multiplexed and then transmitted in the opposite direction. Accordingly, optical signals of the respective absolute values of dispersion "g, h, i and f" ps/nm/km are transmitted in one direction; optical signals of the respective absolute values of dispersion "i, h, g and e" ps/nm/km are transmitted in the opposite direction. The above configuration shows only exemplary and alternatively, optical signals of $\lambda 1$, $\lambda 2$, $\lambda 3$ and $\lambda 8$ may be multiplexed and then transmitted in one direction; optical signals of the other wavelengths may be multiplexed and then transmitted in the opposite direction. As described above, it is sufficient to prevent the absolute values of dispersion of optical signals transmitted in the same direction from being identical.

Also, similarly to the intensity modulator 152 of the above described first embodiment, the intensity modulator used in the CWDM optical transceivers 41x and 51x (x=a to d) is made to permit the characteristic of dispersion of all the fibers used. More specifically, pre-chirp is made to be set so that power penalty is a desired value or less in the dispersion value range of the optical signal of each wavelength. For example, zero chirp is set for an optical signal transmitted from the CWDM optical transceiver 11a; negative chirp is set for optical signals transmitted from the CWDM optical transceivers 11b to 11d, and 21a to 21d. Therefore, dispersion tolerance covering the range of dispersion value with respect to all the CWDM wavelengths is made to be ensured.

In this manner, similarly to the above described first embodiment, the amount of wavelength chirp (chirping parameter) is selected for the optical signal of each transmitted wavelength so that power penalty is a predetermined value or less with respect to all the CWDM wavelengths. Accordingly, wavelength division multiplexing optical transmission at a high bit rate such as 10 Gb/s can be satisfactorily implemented with respect to all the CWDM wavelengths (1471 to 1611 nm).

For example, in the above described exemplary configuration according to the second embodiment, the CWDM optical transceiver 41a transmitting an optical signal of wavelength $\lambda 1$ is made to include an X-Cut LN modulator as the intensity modulator 152; the CWDM optical transceivers 41b to 41d, and 51a to 51d transmitting optical signals of wavelengths $\lambda 2$ to $\lambda 8$ are made to include a Z-Cut LN modulator as the intensity modulator 152.

As described above, in the wavelength division multiplexing optical transmission system according to the second embodiment of the present invention, even when optical fiber having a different characteristic of dispersion from that of DSF is used as the transmission line, the advantageous effects similar to those of the above described first embodiment can be achieved. In other words, even when the number of wavelengths in the negative dispersion region is different from the number of wavelengths in the positive dispersion region in the optical fiber used for transmission, the advantageous effects similar to those of the above described first embodiment can be achieved.

The present invention has been described with respect to specific embodiments. However, the configuration and assignment of each constituent part are not limited to those illustrated in the drawings. Appropriate modifications thereto are possible without departing from the features of the present invention.

For example, in each of the above described embodiments, descriptions are given by taking as an example, two-way wavelength division multiplexing transmission multiplexing optical signals of eight wavelengths. However, the present invention is similarly applicable to two-way wavelength division multiplexing transmission of wavelengths of a number other than eight.

Also, in each of the above described embodiments, descriptions are given assuming that the CWDM optical transceiver includes an intensity modulator. However, the configuration is not limited thereto as long as the function of a wavelength division multiplexing optical transmission apparatus is implemented. For example, a transceiver and an intensity modulator for optical signal may be separately arranged via a transmission line. Also, a transmitter and a receiver for optical signal may be separately arranged.

Further, instead of including the optical multi/demultiplexer, the present invention can also be implemented by the following configuration. A multiplexer may be arranged for optical signal transmitters of respective wavelengths to perform wavelength division multiplexing transmission. The wavelength division multiplexing optical signals thus multiplexed are demultiplexed for each wavelength by a demultiplexer arranged for optical signal receivers of respective wavelengths.

In each of the above described embodiments, there is used the $LiNbO_3$ Mach-Zehnder modulator as the intensity modulator 152 in order to apply zero chirp or negative chirp to laser light transmitted from the light source 151. However, the modulator is not limited thereto as long as it is possible to choose either case where predetermined wavelength chirp can be applied to laser light transmitted from the light source 151 or no wavelength chirp can be made to be applied. Various types of modulators can be used according to the kind of transmission line, the wavelength chirp applied or the like.

When a different type of modulator is used for each CWDM optical transceiver, also, the present invention can be implemented.

Further, each of the above described embodiments describes the example in which two-way transmission is performed in one section using the CWDM technique. However, the wavelength division multiplexing optical transmission system according to the present invention can also be applied to a transmission system having plural sections constituted of a transmission line including an optical signal amplifier and the like, together with optical fiber.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

Further, the inventor's intent is to retain all equivalents of the claimed invention even if the claims are amended later during prosecution.

What is claimed is:

1. A wavelength division multiplexing optical transmission apparatus for transmitting wavelength division multiplexing optical signals, the apparatus comprising:
   a plurality of optical transmitting units outputting optical signals having a different wavelength from each other;
   a plurality of optical intensity modulating units intensity-modulating the optical signals; and
   a wavelength multiplexing unit multiplexing the optical signals intensity modulated by the plurality of optical intensity modulating units, wherein:
   the plurality of optical intensity modulating units set the amount of wavelength chirp adapting to each wavelength of the optical signals for the optical signals output from each of the plurality of optical transmitting units;
   the wavelength multiplexing unit multiplexes the optical signals having the amount of wavelength chirp set respectively and outputs the multiplexed optical signals;
   there are at least two different values of the wavelength chirp set for the optical signals, and the at least two different values of the wavelength chirp are zero and a negative value; and
   the plurality of optical intensity modulating units comprise a first Mach-Zehnder modulator having a symmetrical structure for setting the amount of wavelength chirp to a value of zero and a second Mach-Zehnder modulator having an asymmetrical structure for setting the amount of wavelength chirp to a negative value.

2. The wavelength division multiplexing optical transmission apparatus according to claim 1, wherein an intensity modulating unit among the plurality of optical intensity modulating units comprises a Lithium Niobate modulator.

3. The wavelength division multiplexing optical transmission apparatus according to claim 2, wherein the Lithium Niobate modulator comprises one of an X-Cut Lithium Niobate modulator for setting the amount of wavelength chirp to a value of zero and a Z-Cut Lithium Niobate modulator for setting the amount of wavelength chirp to a negative value.

4. The wavelength division multiplexing optical transmission apparatus according to claim 1, wherein the apparatus uses a coarse wavelength division multiplexing technique.

5. The wavelength division multiplexing optical transmission apparatus according to claim 1, wherein the transmission bit rate of the wavelength division multiplexing optical signals is 10 Gb/s or more.

6. A wavelength division multiplexing optical transmission system transmitting wavelength division multiplexing optical signals, the system comprising:
- a wavelength division multiplexing optical transmission apparatus for transmitting wavelength division multiplexing optical signals, the apparatus comprising:
- a plurality of optical transmitting units outputting optical signals having a different wavelength from each other;
- a plurality of optical intensity modulating units intensity-modulating the optical signals; and
- a wavelength multiplexing unit multiplexing the optical signals intensity modulated by the plurality of optical intensity modulating units, wherein:
- the plurality of optical intensity modulating units set the amount of wavelength chirp adapting to each wavelength of the optical signals for the optical signals output from each of the plurality of optical transmitting units;
- the wavelength multiplexing unit multiplexes the optical signals having the amount of wavelength chirp set respectively and outputs the multiplexed optical signals;
- there are at least two different values of the wavelength chirp set for the optical signals, and the at least two different values of the wavelength chirp are zero and a negative value; and
- the plurality of optical intensity modulating units comprise a first Mach-Zehnder modulator having a symmetrical structure for setting the amount of wavelength chirp to a value of zero and a second Mach-Zehnder modulator having an asymmetrical structure for setting the amount of wavelength chirp to a negative value; and
- a transmission line transmitting the plurality of multiplexed optical signals.

7. The wavelength division multiplexing optical transmission system according to claim 6, wherein:
- the transmission line has arranged therein a plurality of optical fibers having a different characteristic of dispersion; and
- the plurality of intensity modulating units set the amount of wavelength chirp adapting to each wavelength of the optical signals for the plurality of optical signals so that power penalty generated in a range of dispersion value at all wavelengths of the optical signals transmitted is a desired value or less with respect to the different characteristic of dispersion of the optical fiber.

8. The wavelength division multiplexing optical transmission system according to claim 7, wherein the value of power penalty is set so that a required dispersion tolerance on the transmission line can be ensured.

9. The wavelength division multiplexing optical transmission system according to claim 6, wherein the transmission line includes a dispersion shifted fiber.

10. The wavelength division multiplexing optical transmission system according to claim 6, wherein the transmission line includes a single mode fiber.

11. The wavelength division multiplexing optical transmission system according to claim 6, wherein the transmission line includes a non-zero dispersion shifted fiber.

12. The wavelength division multiplexing optical transmission system according to claim 6, wherein a zero dispersion wavelength of the transmission line falls within a transmission wavelength band of the wavelength division multiplexing optical signal.

13. The wavelength division multiplexing optical transmission system according to claim 12, wherein the optical signals are grouped into ones having positive dispersion values and ones having negative dispersion values across the zero dispersion wavelength, and the absolute values of dispersion of the optical signals transmitted on the transmission line in the same direction are different from each other.

14. The wavelength division multiplexing optical transmission system according to claim 13, wherein the optical signals having the identical absolute value of dispersion are transmitted on the transmission line in the opposite direction to each other.

15. The wavelength division multiplexing optical transmission system according to claim 13, wherein the optical signals includes a first optical signal group having the positive dispersion values and a second optical signal group having the negative dispersion values, and the first optical signal group is transmitted in the same direction and the second optical signal group is transmitted in the opposite direction.

16. The wavelength division multiplexing optical transmission system according to claim 12, wherein the optical signals are grouped into ones having positive dispersion values and ones having negative dispersion values across the zero dispersion wavelength, and the amounts of group delay of the optical signals transmitted on the transmission line in the same direction are different from each other.

17. The wavelength division multiplexing optical transmission system according to claim 16, wherein the optical signals having the identical amount of group delay are transmitted on the transmission line in the opposite direction to each other.

18. The wavelength division multiplexing optical transmission system according to claim 6, wherein the system is used a coarse wavelength division multiplexing technique.

19. The wavelength division multiplexing optical transmission system according to claim 6, wherein the transmission bit rate of the optical signals is 10 Gb/s or more.

20. A wavelength division multiplexing optical transmission method of transmitting wavelength division multiplexing optical signals, the method comprising:
- outputting optical signals having a different wavelength from each other;
- intensity-modulating the optical signals and thereby setting the amount of wavelength chirp adapting to each wavelength of the optical signals for each of the optical signals;
- multiplexing the optical signals having the amount of wavelength chirp set respectively; and
- outputting the multiplexed optical signals, wherein
- the optical signals are grouped into a first plurality of optical signals having positive dispersion values and a second plurality of optical signals having negative dispersion values across a zero dispersion wavelength, and the absolute values of dispersion of the optical signals transmitted in the same direction are different from each other, wherein
- the optical signals having the identical absolute value of dispersion are transmitted in an opposite direction to each other.

21. The wavelength division multiplexing optical transmission method according to claim 20, wherein there are at least two different values of wavelength chirp set for the optical signals.

22. The wavelength division multiplexing optical transmission method according to claim 21, wherein the amounts-values of wavelength chirp are a zero and a negative value.

23. The wavelength division multiplexing optical transmission method according to claim 20, further comprising using a coarse wavelength division multiplexing technique.

24. The wavelength division multiplexing optical transmission method according to claim 20, wherein the transmission bit rate of the wavelength division multiplexing optical signals is 10 Gb/s or more.

25. The wavelength division multiplexing optical transmission method according to claim 20, wherein the amount of wavelength chirp adapting to each wavelength of the optical signals is set so that power penalty generated in a range of dispersion value at all wavelengths of the optical signals transmitted is a desired value or less.

26. The wavelength division multiplexing optical transmission method according to claim 25, wherein the value of power penalty is set so that a required dispersion tolerance on the transmission line can be ensured.

27. The wavelength division multiplexing optical transmission method according to claim 20, wherein the optical signals includes a first optical signal group having the positive dispersion values and a second optical signal group having the negative dispersion values, and the first optical signal group is transmitted in the same direction and the second optical signal group is transmitted in the opposite direction.

28. The wavelength division multiplexing optical transmission method according to claim 20, wherein the optical signals are grouped into a first plurality of optical signals having positive dispersion values and a second plurality of optical signals having negative dispersion values across the zero dispersion wavelength, and the amounts of group delay of the optical signals transmitted in the same direction are different from each other.

29. The wavelength division multiplexing optical transmission method according to claim 28, wherein the optical signals having the identical amount of group delay are transmitted in the opposite direction to each other.

* * * * *